United States Patent
Wang et al.

(10) Patent No.: US 12,224,989 B2
(45) Date of Patent: Feb. 11, 2025

(54) INFORMATION LEAKAGE MONITORING METHOD AND SYSTEM, AND ELECTRONIC DEVICE

(71) Applicant: Hangzhou Hikvision Digital Technology Co., Ltd., Zhejiang (CN)

(72) Inventors: Bin Wang, Zhejiang (CN); Shaopeng Zhou, Zhejiang (CN); Xu Wang, Zhejiang (CN); Feng Zhang, Zhejiang (CN); Zhicheng Bi, Zhejiang (CN); Li Wan, Zhejiang (CN); Jun Li, Zhejiang (CN); Chonghua Wang, Zhejiang (CN); Haitao Zhao, Zhejiang (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/720,544

(22) PCT Filed: Dec. 1, 2022

(86) PCT No.: PCT/CN2022/135997
§ 371 (c)(1),
(2) Date: Sep. 11, 2024

(87) PCT Pub. No.: WO2023/109524
PCT Pub. Date: Jun. 22, 2023

(65) Prior Publication Data
US 2024/0430239 A1    Dec. 26, 2024

(30) Foreign Application Priority Data
Dec. 17, 2021 (CN) ......................... 202111553049.6

(51) Int. Cl.
*H04L 9/40* (2022.01)
*H04L 67/56* (2022.01)
*H04L 69/18* (2022.01)

(52) U.S. Cl.
CPC .......... *H04L 63/0281* (2013.01); *H04L 67/56* (2022.05); *H04L 69/18* (2013.01)

(58) Field of Classification Search
CPC ...... H04L 63/0281; H04L 67/56; H04L 69/18
See application file for complete search history.

(56) References Cited

U.S. PATENT DOCUMENTS 9,660,879 B1 *  5/2017  Rothstein .............. H04L 43/026
9,882,985 B1 *  1/2018  Esam ...................... G06F 16/27
(Continued)

FOREIGN PATENT DOCUMENTS

| CN | 103095530 | 5/2013 |
| CN | 112491788 | 3/2021 |

(Continued)

OTHER PUBLICATIONS

International Search Report and Written Opinion in International Appln. No. PCT/CN2022/135997, mailed on Jan. 28, 2023, 9 pages (with Partial English Translation).

(Continued)

*Primary Examiner* — Gil H. Lee
(74) *Attorney, Agent, or Firm* — Fish & Richardson P.C.

(57) ABSTRACT

Traffic proxy-based Internet of Things terminal key information leakage monitoring methods and systems, electronic devices, storage media, and computer programs. An example method includes: receiving a proxy request sent by an Internet of Things terminal, the proxy request including protocol related information of the Internet of Things terminal, and the protocol related information including part or all of device model information, service type information, and data packet information; according to the protocol related information of the Internet of Things terminal, determining a target protocol corresponding to the Internet of Things terminal; and allocating a target proxy service to the (Continued)

Internet of Things terminal according to the target protocol, and a usage state and an online state of each proxy service in a full traffic proxy pool, and performing key information monitoring on the traffic of the Internet of Things terminal by the target proxy service.

9 Claims, 2 Drawing Sheets

(56) References Cited

U.S. PATENT DOCUMENTS

| | | |
|---|---|---|
| 2007/0294539 A1 | 12/2007 | Shulman et al. |
| 2012/0166665 A1 | 6/2012 | Martin |
| 2023/0216732 A1* | 7/2023 | Liu .................. H04L 67/146 709/220 |

FOREIGN PATENT DOCUMENTS

| | | |
|---|---|---|
| CN | 112839083 | 5/2021 |
| CN | 113037551 | 6/2021 |
| CN | 113726789 | 11/2021 |
| CN | 113938524 | 1/2022 |

OTHER PUBLICATIONS

Notice of Allowance in Chinese Appln. No. 202111553049.6, mailed on Feb. 11, 2022, 6 pages (Submitted with Machine/Partial Translation).

Office Action in Chinese Appln. No. 202111553049.6, mailed on Jan. 24, 2022, 16 pages (Submitted with Machine/Partial Translation).

* cited by examiner

INFORMATION LEAKAGE MONITORING METHOD AND SYSTEM, AND ELECTRONIC DEVICE

CROSS REFERENCE TO RELATED APPLICATIONS

This application is the national phase application of International Application No. PCT/CN2022/135997 filed on Dec. 1, 2022, which claims priority to a Chinese Patent Application No. 202111553049.6 filed on Dec. 17, 2021, the entire contents of which are incorporated herein by reference.

TECHNICAL FIELD

The present disclosure relates to the field of information security technologies, and in particular to a method and a system for monitoring information leakage, an electronic device, a storage medium and a computer program.

BACKGROUND

With the deep application of technologies such as artificial intelligence and big data, the Internet of Things (IoT) has been applied in various fields such as aerospace, industry and social security. IoT smart terminals can collect various perception data in a physical world in real time, and are key nodes between the physical world and a digital world.

IoT terminals have characteristics of massive heterogeneity, limited resources and open deployment, and thus most of which have relatively low performance and intelligence. At the same time, terminal devices technologies and protocol types are diverse, and data is shared in multiple domains, and thus data privacy and integrity security have become one of key issues limiting the development of the IoT. Therefore, it is of great significance to effectively monitor key information leakage of the IoT terminals.

SUMMARY

In view of this, the present disclosure provides a method and a system for monitoring information leakage of Internet of Things (IoT) terminals based on a traffic proxy, an electronic device, a storage medium and a computer program.

Specifically, the present disclosure is realized through the following technical solutions.

According to a first aspect of embodiments of the present disclosure, there is provided a method for monitoring key information leakage of an Internet of Things terminal based on a traffic proxy, including: receiving a proxy request sent by an Internet of Things (IoT) terminal, wherein the proxy request includes protocol-related information of the IoT terminal, and the protocol-related information includes part or all of device model information, service type information and data packet information; determining a target protocol corresponding to the IoT terminal according to the protocol-related information of the IoT terminal; allocating a target proxy service to the IoT terminal according to the target protocol and an usage state and an online state of one or more proxy services in a full traffic proxy pool; and performing key information monitoring on traffic of the IoT terminal through the target proxy service, wherein the full traffic proxy pool includes a plurality of proxy services corresponding to different protocols, and the target proxy service is a proxy service corresponding to the target protocol and having a usage state of being idle and an online state of being online in the plurality of proxy services.

According to a second aspect of the embodiments of the present disclosure, there is provided a system for monitoring information leakage, including: a dynamic domain access unit and one or more proxy services, wherein the dynamic domain access unit is configured to receive a proxy request sent by an Internet of Things (IoT) terminal, wherein the proxy request includes protocol-related information of the IoT terminal, and the protocol-related information includes part or all of device model information, service type information and data packet information; the dynamic domain access unit is further configured to determine a target protocol corresponding to the IoT terminal according to the protocol-related information of the IoT terminal; and the dynamic domain access unit is further configured to allocate a target proxy service to the IoT terminal according to the target protocol and an usage state and an online state of one or more proxy services in a full traffic proxy pool, wherein the full traffic proxy pool includes a plurality of proxy services corresponding to different protocols, and the target proxy service is a proxy service corresponding to the target protocol and having a usage state of being idle and an online state of being online in the plurality of proxy services, wherein in response to the proxy service serving as the target proxy service, the dynamic domain access unit is further configured to perform key information monitoring on traffic of the IoT terminal through the target proxy service.

According to a third aspect of the embodiments of the present disclosure, there is provided electronic device, including a processor and a memory, wherein the memory stores machine-executable instructions that can be executed by the processor, and the processor is configured to execute the machine-executable instructions to perform the following operations: receiving a proxy request sent by an Internet of Things (IoT) terminal, wherein the proxy request includes protocol-related information of the IoT terminal, and the protocol-related information includes part or all of device model information, service type information and data packet information; determining a target protocol corresponding to the IoT terminal according to the protocol-related information of the IoT terminal; allocating a target proxy service to the IoT terminal according to the target protocol and an usage state and an online state of one or more proxy services in a full traffic proxy pool; and performing key information monitoring on traffic of the IoT terminal through the target proxy service, wherein the full traffic proxy pool includes a plurality of proxy services corresponding to different protocols, and the target proxy service is a proxy service corresponding to the target protocol and having a usage state of being idle and an online state of being online in the plurality of proxy services.

According to a fourth aspect of the embodiments of the present disclosure, there is provided a machine-readable storage medium storing machine-executable instructions, where the machine-executable instructions, when executed by a processor, cause the processor to implement the method for monitoring key information leakage of the Internet of Things terminal based on the traffic proxy according to the first aspect.

According to the fifth aspect of the embodiments of the present disclosure, there is provided a computer program stored on a machine-readable storage medium, where the computer program, when executed by a processor, causes the processor to implement the method for monitoring key information leakage of the Internet of Things terminal based on the traffic proxy according to the first aspect.

According to the method for monitoring key information leakage of the Internet of Things (IoT) terminal based on the traffic proxy in the embodiments of the present disclosure, by constructing the full traffic proxy pool, when receiving the proxy request sent by the IoT terminal, the target protocol corresponding to the IoT terminal can be determined according to device information, service information and data packet information of the IoT terminal included in the proxy request; further, the target proxy service corresponding to the target protocol and having a usage state of being idle and an online state of being online is allocated to the IoT terminal according to the target protocol corresponding to the IoT terminal and the usage state and the online state of one or more proxy services in the full traffic proxy pool; and key information monitoring is performed on traffic of the IoT terminal through the target proxy service, key information monitoring of the IoT terminal based on the traffic proxy can be realized, thereby reducing deployment conditions for monitoring the key information of the IoT terminal, solving the problem of the lack of proxy services for multi-heterogeneous smart terminals, realizing lightweight data collection and analysis, and improving the efficiency of key information monitoring.

DETAILED DESCRIPTION OF THE EMBODIMENTS

Exemplary embodiments will be described in detail herein, examples of which are shown in accompanying drawings. When the following description refers to the drawings, unless otherwise indicated, same number in different drawings indicates same or similar elements. Implementations described in the following exemplary embodiments do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms "a", "the" and "said" in the singular form used in the present disclosure and the appended claims are also intended to include plurality, unless otherwise clearly indicated in the context.

In order to enable a person skilled in the art to better understand the technical solutions provided by embodiments of the present disclosure, and to make the above objects, features and advantages of the embodiments of the present disclosure more clear and understandable, technical solutions in the embodiments of the present disclosure will be described in further detail below with reference to the accompanying drawings.

At present, there are no technical solutions for monitoring the leakage of massive key information of the Internet of Things (IoT) terminal. Solutions for monitoring key information of an Internet are usually divided into two parts, namely data collection and data identification. The data collection depends on setting port mirroring or using optical splitters on a core layer or a convergence layer switch, and the data identification depends on service tags. The current solutions are not suitable for IoT scenarios with massive heterogeneous terminals with, and have many problems.

1. Original data is collected by using a switch mirrored splitting method. All the data of the entire network are collected, and thus the difficulty of data analysis is relatively high, and the efficiency of the data analysis is relatively low.

2. The switch mirrored splitting method not only requires extremely high hardware configuration and performance of devices, but also requires extremely high deployment environment, and thus it is unable to adapt to the characteristics of limited resources and open deployment.

It should be noted that the method for monitoring key information leakage of the Internet of Things terminal based on the traffic proxy provided in the embodiments of the present disclosure can be applied to a system for monitoring key information leakage of an Internet of Things terminal based on a traffic proxy (referred to as a system for monitoring key information, or a key information monitoring system). In some examples, the method for monitoring key information leakage of the Internet of Things terminal based on the traffic proxy can be realized by at least one processor in the key information monitoring system calling and executing various service modules.

Figure 1:
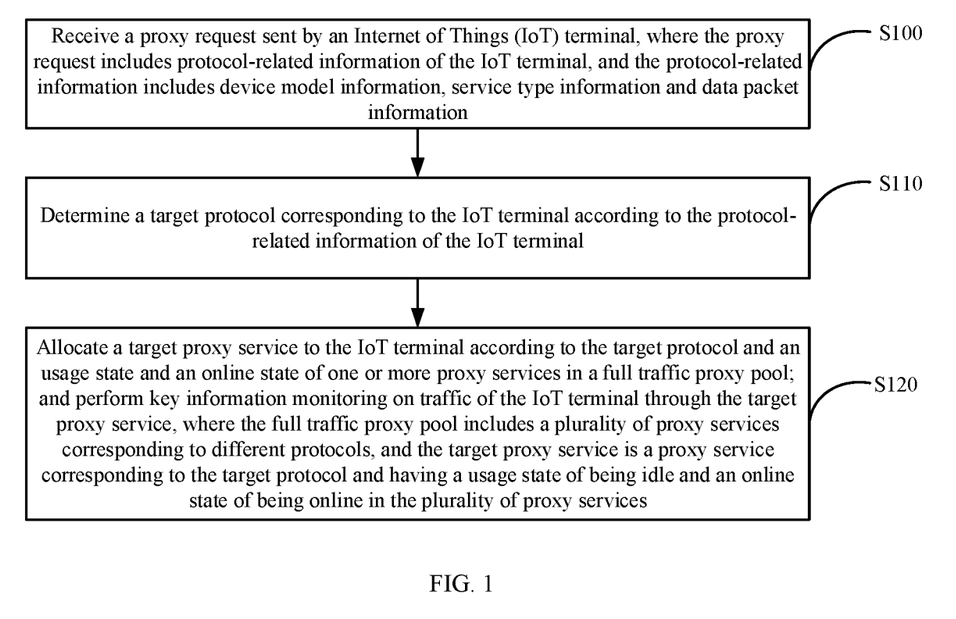
FIG. 1 is a flowchart illustrating a method for monitoring key information leakage of an Internet of Things terminal based on a traffic proxy according to an exemplary embodiment of the present disclosure.

Referring to FIG. 1, FIG. 1 is a flowchart illustrating a method for monitoring key information leakage of an Internet of Things terminal based on a traffic proxy according to an exemplary embodiment of the present disclosure. As shown in FIG. 1, the method for monitoring key information leakage of the Internet of Things terminal based on the traffic proxy can include the following steps.

Step S100, a proxy request sent by an Internet of Things (IoT) terminal is received, wherein the proxy request includes protocol-related information of the IoT terminal, and the protocol-related information includes part or all of device information, service information and data packet information.

Step S110, a target protocol corresponding to the IoT terminal is determined according to the protocol-related information of the IoT terminal.

In the embodiment of the present disclosure, in order to realize lightweight data collection and analysis, and improve the efficiency of monitoring key information, a proxy services can be allocated to an IoT terminal according to a protocol corresponding to the IoT terminal, and key information monitoring is performed on traffic of the IoT terminal through the proxy service allocated to the IoT terminal. The key information refers to target information to be monitored, for example, information containing any interesting content such as special characters and fields, which can be determined according to actual situations, and is not limited in the present disclosure.

For example, the IoT terminal can request a key information monitoring system to allocate a corresponding proxy service to the IoT terminal by sending the proxy request.

For example, different IoT terminals may require different protocols. For example, IoT terminals with different device models may require different protocols, different service types of the same IoT terminal may also require different protocols, and data packet structures of different protocols may also be different.

Accordingly, the proxy request sent by the IoT terminal can include protocol-related information.

For example, the protocol-related information can include information used to identify protocols required for IoT terminals. The protocol-related information can include part or all of device model information, service type information and data packet information. In some examples, the device model information can include a device name, a device type, a device model, and the like. For example, the device model information can include the following information: device name: explosion-proof Hawkeye; device type: speed dome camera; and device model: iDS-2DP9C8425-CX(T4/316L). The service type information can indicate a type of services supported by the IoT terminals. The data packet information can include data structure format and basic data unit information. For example, the data packet information can be a basic HTTP protocol packet: HTTP/1.1 302 Found Server: nginx/1.21.6 Date: Fri, 29 Jul. 2022 03:36:30 GMT Content-Type: text/html; charset=UTF-8 Content-Length: 0 Connection: keep-alive.

For example, IoT terminals of one device model may require one or more protocols.

A service type of the IoT terminal can correspond to a protocol.

A data packet structure of the IoT terminal can correspond to a protocol.

When receiving the proxy request sent by the IoT terminal, the key information monitoring system can determine the protocol (referred to as the target protocol in the present disclosure) corresponding to the IoT terminal according to the protocol-related information included in the proxy request sent by the IoT terminal.

For example, the proxy request sent by the IoT terminal can include the device model, the service type and basic data packet of the IoT terminal. The key information monitoring system can determine the target protocol corresponding to the IoT terminal according on the device model, the service type and the data packet structure of the basic data packet of the IoT terminal.

For example, a basic data packet of a protocol can be a data packet including all the basic elements of the protocol.

Step S120, a target proxy service is allocated to the IoT terminal according to the target protocol and an usage state and an online state of one or more proxy services in a full traffic proxy pool; and key information monitoring is performed on traffic of the IoT terminal through the target proxy service, wherein the full traffic proxy pool includes a plurality of proxy services corresponding to different protocols, and the target proxy service is a proxy service corresponding to the target protocol and having a usage state of being idle and an online state of being online in the plurality of proxy services.

In the embodiment of the present disclosure, considering that the IoT terminals have characteristics of massive heterogeneity and different IoT terminals have different requirements for protocols, in order to avoid the lack of proxy services for multi-heterogeneous IoT terminals, a full traffic proxy pool for IoT terminal devices can be constructed, and the full traffic proxy pool can include a plurality of proxy services corresponding to different protocols.

For example, the full traffic proxy pool can include conventional network protocol proxy services and IoT proprietary protocol proxy services.

For example, conventional network protocols can include, but are not limited to, a hyper text transfer protocol (HTTP), a hyper text transfer protocol over secure socket layer (HTTPS) protocol, a file transfer protocol (FTP), and the like.

IoT proprietary protocols can include, but are not limited to, a real time streaming protocol (RTSP), a message queuing telemetry transport (MQTT) protocol, a session initiation protocol (SIP), and the like.

For example, the key information monitoring system can monitor an usage state and an online state of one or more proxy services in the full traffic proxy pool.

For example, the usage state of the proxy services can include occupied or idle.

For example, the online state of the proxy services can include online or offline.

It should be noted that in the embodiment of the present disclosure, the usage state of the proxy services can be determined based on an allocation mode of the proxy services.

For example, in the case that the allocation mode of the proxy services is one-to-one allocation, that is, in the case that one proxy service provides services to one IoT terminal, if the proxy service is allocated to the IoT terminal, the usage state of the proxy service is occupied; and if the proxy service is not allocated to the IoT terminal, the usage state of the proxy service is idle.

In the case that the allocation mode of the proxy services is one-to-many allocation, that is, in the case that one proxy service provides services to a plurality of IoT terminals (that is, N IoT terminals, and N≥2), if one proxy service is allocated to M IoT terminals (M<N), the usage state of the proxy service is idle; and if the proxy service is allocated to N IoT terminals, the usage state of the proxy service is occupied.

For example, when the target protocol corresponding to the IoT terminal is determined, the key information monitoring system can allocate a proxy service (referred to as the target proxy service in the present disclosure) corresponding to the target protocol and having a usage state of being idle and an online state of being online to the IoT terminal according to the target protocol and the usage state and the online state of one or more proxy services in the full traffic proxy pool; and key information monitoring is performed on the traffic of the IoT terminal through the target proxy service.

For example, in the case of allocating the target proxy service to the IoT terminal, the key information monitoring system can send relevant information (for example, an internet protocol (IP) address) of the target proxy service to the IoT terminal, so that the IoT terminal can access the target proxy service. Further, the target proxy service can forward the traffic of the IoT terminal and perform key information monitoring on the traffic of the IoT terminal.

It can be seen that in the method flowchart shown in FIG. 1, by constructing the full traffic proxy pool, when receiving the proxy request sent by the IoT terminal, the target protocol corresponding to the IoT terminal can be determined according to device information, service information and data packet information of the IoT terminal included in the proxy request; further, the target proxy service corresponding to the target protocol and having a usage state of being idle and an online state of being online is allocated to the IoT terminal according to the target protocol corresponding to the IoT terminal and the usage state and the online state of one or more proxy services in the full traffic proxy pool; and key information monitoring is performed on traffic of the IoT terminal through the target proxy service, key information monitoring of the IoT terminal based on the traffic proxy can be realized, thereby reducing deployment conditions for monitoring the key information of the IoT terminal, solving the problem of the lack of proxy services for multi-heterogeneous smart terminals, realizing lightweight data collection and analysis, and improving the efficiency of key information monitoring.

In some embodiments, the full traffic proxy pool includes one or more proxy services corresponding to a single protocol, and one or more proxy services corresponding to a plurality of protocols.

In response to the target protocol including a plurality of different protocols, the target proxy service is a proxy service corresponding to the plurality of different protocols and having a usage state of being idle and an online state of being online.

For example, considering that the same IoT terminal may need to use a plurality of protocols, for example, for a video surveillance front end, it may need to use the RTSP protocol when fetching streams, and it may need to use the HTTP or HTTPS protocol when configuring web pages. If the proxy services all correspond to a single protocol, a plurality of proxy services may need to be allocated for this type of IoT terminal, and thus the processing process of the traffic forwarding and key information monitoring may be relatively complex.

Therefore, in order to simplify the processing process of the traffic forwarding and key information monitoring, the full traffic proxy pool can include not only proxy services corresponding to a single protocol, but also proxy services corresponding to a plurality of protocols, that is, a single proxy service can perform key information monitoring on traffic of the plurality of different protocols.

Accordingly, in response to the target protocol including a plurality of different protocols, the target proxy service is a proxy service corresponding to the plurality of different protocols and having a usage state of being idle and an online state of being online.

For example, assuming that a target protocol corresponding to an IoT terminal A includes a protocol 1 and a protocol 2, and a protocol corresponding to a proxy service a includes the protocol 1 and the protocol 2, and an usage state is idle and an online state is online, then a target proxy service can be the proxy service a.

For another example, assuming that a target protocol corresponding to an IoT terminal A includes a protocol 1 and a protocol 2, and a protocol corresponding to a proxy service b includes the protocol 1, the protocol 2 and a protocol 3, and an usage state is idle and an online state is online, then a target proxy service can be the proxy service b.

It should be noted that in the case that the target protocol includes a plurality of different protocols, a proxy service corresponding to a protocol that accurately matches with the target protocol can be preferentially selected as the target proxy service.

Taking the above examples as an example, for the IoT terminal A, in the case that both the proxy service a and the proxy service b exist, the proxy service a can be preferentially determined as the target proxy service.

In some embodiments, the proxy request can further include device device identification information. In step S120, after allocating the target proxy service to the IoT terminal, the method can further include:

generating a uniqueness verification identifier according to the device identification information of the IoT terminal and identification information of the target proxy service, so that the target proxy service performs service-bound uniqueness verification according to the device identification information of the IoT terminal, the identification information of the target proxy service and the uniqueness verification identifier in response to receiving the traffic sent by the IoT terminal, and performs key information monitoring on the traffic in response to a successful verification.

For example, in order to realize lightweight data collection and analysis for a single terminal device, a proxy service allocated to the IoT terminal can be bound one-on-one with the IoT terminal, and other devices other than the IoT terminal cannot use the proxy service.

Accordingly, after allocating the target proxy service to the IoT terminal, the key information monitoring system can generate a uniqueness verification identifier according to the device identification information (for example, an IP address) of the IoT terminal and identification information (for example, an IP address or a number (in the case that all proxy services are numbered uniformly)) of the target proxy service. The uniqueness verification identifier can be used to verify a binding relationship between the IoT terminal and the target proxy service (which can be referred to as service-bound uniqueness verification).

The key information monitoring system can store the generated uniqueness verification identifier in a database, for example, a proxy service center database.

For example, for any uniqueness verification identifier, the identification information of the proxy service can be stored in the proxy service center database in association with the uniqueness verification identifier.

When receiving the traffic sent by the IoT terminal, the target proxy service can perform service-bound uniqueness verification according to the device identification information of the IoT terminal, the identification information of the target proxy service and the uniqueness verification identifier in the proxy service center database.

For example, the target proxy service can generate a uniqueness verification identifier to be verified using a preset uniqueness verification identifier generation algorithm according to the device identification information of the IoT terminal and the identification information of the target proxy service.

It should be noted that the target proxy service generates the uniqueness verification identifier to be verified according to the device identification information of the IoT terminal and the identification information of the target proxy service, which is the same as the algorithm used by the key information monitoring system to generate the uniqueness verification identifier to be verified according to the device identification information of the IoT terminal and the identification information of the target proxy service.

The target proxy service can compare the uniqueness verification identifier to be verified with the uniqueness verification identifier stored in the proxy service center database, if the two uniqueness verification identifiers are the same, it is determined that the verification succeeds; otherwise, it is determined that the verification fails.

For example, the target proxy service can perform key information monitoring on the received traffic of the IoT terminal when it is determined that the verification succeeds.

In some embodiments, in step S120, performing key information monitoring on the traffic of the IoT terminal through the target proxy service cam include:

segmenting a data packet of the IoT terminal according to a protocol template of the target protocol, wherein the protocol template includes part or all of protocol data packet size information, protocol data structure information, protocol data field information, protocol data field feature set information and protocol data interaction mode information; and performing key information monitoring according to the segmented data of the IoT terminal.

For example, in order to refine the data granularity of key information monitoring, when receiving the traffic sent by the corresponding IoT terminal, the target proxy service can segment the data of the traffic and perform key information monitoring on the segmented data.

For example, in order to improve the rationality and accuracy of data segmentation, one or more protocol templates corresponding to different protocols can be set in advance.

For example, the protocol templates can include, but are not limited to, part or all of information such as protocol data packet size information, protocol data structure information, protocol data field information, protocol data field feature set information and protocol data interaction mode information.

For example, the protocol data packet size information can be used to match and verify fixed-length protocol packets.

Since some protocol fields have fixed feature values, the protocol fields can be located according to the protocol data field feature set information.

Since some protocols have multiple interaction modes, for example, GET, POST, PUT, and the like in the HTTP, which belong to different interaction modes of the same protocol, fine-grained localization can be further carried out based on the protocol data interaction mode information.

Accordingly, when receiving the traffic of the corresponding IoT terminal, the target proxy service can segment the data packet of the IoT terminal according to the protocol template of the target protocol.

For example, when segmenting the data packet of the IoT terminal, the target proxy service can try to avoid destroying the integrity of the data structure, that is, try to avoid segmenting a single field into multiple parts.

For example, after segmenting the data packet, the target proxy service can perform key information monitoring according to the segmented data of the IoT terminal.

In an example, segmenting the data packet of the IoT terminal described above can include:

segmenting the data packet of the IoT terminal according to atomic granularity to obtain atomic granularity data corresponding to the data packet, wherein the atomic granularity data is in a form of location-content, and the atomic granularity data is the smallest unit of the data packet.

For example, considering practical scenarios, the key information usually does not cross the smallest unit of the data packet, that is, the key information is usually included in the content of a single smallest unit.

For example, taking an IP data packet as an example, the smallest unit of the IP data packet is a field, and key information in the IP data packet is usually included in a single field.

Accordingly, when segmenting the data packet, the data packet can be segmented into the smallest unit of the data packet (referred to as atomic granularity data in the present disclosure) according to the protocol template, so as to improve the efficiency and accuracy of monitoring key information.

For example, the atomic granularity data of the data packet can be in a form of location-content, where the location is used to record a location of the atomic granularity data in the data packet, for example, a field A in a packet header, a field B in a packet body, and the like; and the content is used to record specific contents of the atomic granularity data, and thus when performing key information detection, the detection can be performed according to the contents; and when detecting the key information, a location of the key information in the data packet can be quickly located based on the location.

In an example, in step S120, before performing key information monitoring on the traffic of the IoT terminal through the target proxy service, the method can further include:

filtering invalid traffic in the traffic of the IoT terminal according to one or more invalid traffic features in an invalid traffic feature library through the target proxy service.

For example, considering that some types of traffic usually do not carry key information, for example, traffic with the suffix ".css", which is usually used to record style information of a network, structure information and font size of a web interface, and the like, and does not carry key information that users are interested in.

Accordingly, in order to improve the efficiency of key information monitoring, for the traffic of the IoT terminal, before performing key information monitoring on the traffic, traffic received from the IoT terminal that does not carry the key information (referred to as invalid traffic in the present disclosure) can be filtered first.

For example, in order to improve the efficiency and accuracy of filtering the invalid traffic, an invalid traffic feature library can be pre-configured. The invalid traffic feature library is used to store feature information of the invalid traffic, for example, text features, suffix features, and the like.

Accordingly, when receiving the traffic of the corresponding IoT terminal, the target proxy service can filter the invalid traffic in the traffic of the IoT terminal according to the invalid traffic features in the invalid traffic feature library, and perform key information monitoring on the filtered traffic of the IoT terminal.

In some embodiments, in step S120, the performing key information monitoring on the traffic of the IoT terminal through the target proxy service includes:

performing key information detection on the traffic of the IoT terminal using a preset key information detection method;

wherein the preset key information detection method includes at least two of following detection methods:

a key information detection method based on a feature set, a key information detection method based on a pattern set and a key information detection method based on a machine learning model set.

For example, in order to improve the accuracy of key information monitoring, when perform key information monitoring on the traffic of IoT terminal, it is no longer limited to the method of service tags, but can be carried out by combining various detection methods.

For example, at least two detection methods can be used to perform key information detection on the traffic of IoT terminal:

a key information detection method based on a feature set, a key information detection method based on a pattern set and a key information detection method based on a machine learning model set.

For example, the feature set can include, but is not limited to, text features and/or symbol features. By detecting contents that match the features in the feature set in the traffic of the IoT terminal, the contents can be determined as key information.

For example, the pattern set can include, but is not limited to, a regular expression set and/or a structural pattern set. By detecting contents that match the regular expression and/or the structural pattern in the pattern set in the traffic of the IoT terminal, the contents can be determined as key information.

For example, the machine learning model set includes one or more machine learning models used for performing key information detection.

For example, when key information detection is performed by using the machine learning models, in order to make the accuracy relatively high, key information detection can be performed in combination with the context information.

For example, when a mobile phone number in traffic data is recognized by using the machine learning models, 11 digits in "Mobile phone: 136***" can be recognized as a mobile phone number in combination with the context, thereby avoiding misidentification of a long string of digits such as a task identify (ID) as the mobile phone number.

It should be noted that the accuracy of performing key information detection using the machine learning models is relatively high, but its performance consumption is also relatively high. However, the accuracy of performing key information detection using feature sets or pattern sets is relatively low, but its performance consumption is also relatively low. Therefore, when performing key information detection, different detection methods can be selected/combined according to requirements.

For example, in the case that performance consumption allows, at least two key information detection methods can be used to detect the traffic of the IoT terminal, and then detection results of different key information detection methods can be fused.

In the case that it is impossible to meet performance consumption requirements of respectively performing key information detection on the traffic of the IoT terminal by using multiple detection methods, one key information detection method can be used to verify detection results of other key information detection methods.

For example, in the case that it is impossible to meet performance consumption requirements of performing key information detection on the traffic of the IoT terminal by using a machine learning model-based key information detection method, the key information detection method based on the feature set and/or the key information detection method based on the pattern set can be used to perform key information detection on the traffic of the IoT terminal. For the detected key information, the context information of the key information can be obtained based on the location of the key information in the traffic, and then the detected key information can be verified using the machine learning model-based key information detection method.

For another example, in the case that it is impossible to meet performance consumption requirements of respectively performing key information detection on the traffic of the IoT terminal by using multiple detection methods, the machine learning model-based key information detection method can be used to perform key information detection on the traffic of the IoT terminal. For the detected key information, the key information detection method based on the feature set and/or the key information detection method based on the pattern set can be used to detect the detected key information to obtain more accurate key information (filtering out invalid context information). In some embodiments, in step S120, after performing key information monitoring on the traffic of the IoT terminal through the target proxy service, the method further includes:

in response to key information being detected, displaying one or more key information detection results, wherein the key information detection results include one or more of the following:

a protocol to which the key information belongs, a data packet to which the key information belongs, location information of the key information in the data packet, a content of the key information and a type of the key information.

For example, after the target proxy service performs key information detection on the traffic of the IoT terminal, in the case that the key information is detected, one or more key information detection results can be displayed, so that relevant personnel can better check the key information detection results.

For example, the key information detection results include one or more of the following:

a protocol to which the key information belongs, a data packet to which the key information belongs, location information of the key information in the data packet, a content of the key information and a type of the key information.

In some embodiments, in step S120, after performing key information monitoring on the traffic of the IoT terminal through the target proxy service, the method further includes:

in response to key information being detected, giving an early warning of the key information detection results.

For example, after the target proxy service performs key information monitoring on the traffic of the IoT terminal, in the case that the key information is detected, an early warning of the key information detection results can be given.

For example, the target proxy service can give an early warning of the key information detection results by email or short messaging service (SMS).

In order to enable a person skilled in the art to better understand the technical solutions provided by embodiments of the present disclosure, technical solutions in the embodiments of the present disclosure will be described below with reference to specific examples.

In the embodiment of the present disclosure, a full traffic dynamic proxy service can be constructed, which includes a full traffic proxy pool and a dynamic domain access service, respectively.

For example, the full traffic proxy pool can include conventional network protocol proxy services (sub proxy pools such as HTTP, HTTPS and FTP) and IoT protocol proxy services (sub proxy pools such as RTSP, MQTT and SIP).

For example, a dynamic domain access module can automatically allocate and bind required proxy service for IoT terminals requesting access, thereby realizing one-on-one proxy seamless access and data collection.

For example, a traffic segmentation and filtering service can automatically match traffic protocol types based on a multimodal matching technology (that is, an automatic matching technology based on a multi-template library) and perform fine-grained segmentation on the collected traffic data according to the corresponding protocol template to obtain the smallest unit (that is, the atomic granularity data), and then uniformly format the atomic granularity data in the form of "location-content" to realize precise segmentation and positioning of the data.

For example, an invalid traffic filtering mode can be set, and conventional and custom noise traffic (that is, the invalid traffic) can be filtered according to traffic features and traffic types.

For example, key information detection can be performed on formatted traffic data units (in the form of "location-content") after segmentation and filtering; and key information in the atomic granularity data can be detected by using feature search, pattern matching and the machine learning model and correlated with its location information for problem display and early warning.

In the embodiment, an implementation process of the method for monitoring key information leakage of the Internet of Things terminal based on the traffic proxy is as follows.

1. Construct a Full Traffic Proxy Pool.

For example, a conventional network protocol proxy pool is constructed, including protocol proxy services such as HTTP, HTTPS and FTP; and an IoT protocol proxy pool is constructed, including protocol proxy services such as RTSP, MQTT and SIP.

For example, all proxy services are based on corresponding conventional network protocols and IoT protocols, and can realize a unified interface system such as data docking, data relay, data response, data storage, data lifecycle hook, data uniqueness verification, sub-service resource usage report and sub-service online state report, which lays a foundation for dynamic access and insensitivity proxy of the traffic data of the subsequent tested system.

2. Construct a Dynamic Domain Access Service.

For example, a dynamic domain access service includes proxy request response, protocol mode autonomous identification, proxy resource dynamic monitoring, proxy allocation load balancing, service-bound uniqueness verification, and the like.

For example, the dynamic domain access service can start a real-time response to proxy resource requests, and monitor and receive proxy requests initiated by all tested targets (IoT terminals).

For example, the proxy request can include basic information (that is, the above-mentioned protocol-related information) of the tested target, including but not limited to IP address, device model, service type, basic data packet, and the like. For the submitted basic information, the proxy protocol required for the tested target can be autonomously identified through device model matching, service type matching and data packet structure matching.

For example, the dynamic domain access service can receive resource usage state and online state information uploaded by the full traffic proxy pool in real time, and dynamically allocate the proxy service required by the tested target (that is, the target proxy service) according to the proxy protocol required by the tested target (that is, the above-mentioned target protocol), and the resource usage state and online state information of the full traffic proxy pool, thereby realizing dynamic access and load balancing of the proxy service.

For example, after the proxy service is allocated, a uniqueness verification identifier can be generated according to device information of the tested target and identification information of the allocated proxy service. The uniqueness verification identifier is used to perform service-bound uniqueness verification between the tested target and the target proxy service, thereby realizing the uniqueness binding between the proxy service and the tested target, ensuring that non-tested targets cannot use the proxy service, ensuring the security and uniqueness of the data, and greatly reducing the difficulty of subsequent data filtering.

3. Construct a Protocol Template Library.

For example, a protocol template library is constructed based on standard rules of conventional network protocols (such as HTTP, HTTPS and FTP) and Internet of Things protocols (such as RTSP, MQTT and SIP). Each protocol template needs to contain protocol data packet size information, protocol data structure information, protocol data field information, protocol data field feature set information, protocol data interaction mode information, and the like, so as to perform fine-grained data segmentation and filtering based on the protocol template in the next step.

4. Construct an Invalid Traffic Feature Library.

For example, an invalid traffic feature library can be constructed according to actual service requirements and invalid traffic features.

For example, features in the invalid traffic feature library can include text features, suffix features, and the like.

For example, the features in the invalid traffic feature library can support custom loading and deletion.

5. Construct a Traffic Segmentation and Filtering Service.

For example, specific invalid traffic data can be filtered out from the traffic of the tested target according to the invalid traffic feature library, thereby reducing the pressure of data analysis.

For the filtered effective traffic data, the traffic data can be matched with the protocol template one by one using a multi-mode matching technology according to the protocol template library. The traffic data can be segmented into atomic granularity data according to structural information and field information of the protocol template, and is uniformly formatted in the form of "location-content".

6. Construct a Key Information Detection Service.

For example, key data detection is performed on the segmented atomic granularity data.

For example, key fields and key contents can be detected based on a feature set (including text features, symbol features, and the like), a pattern set (including regular expressions, structural patterns, and the like) and a machine learning model set, and specific key information can be extracted; and then, the extracted key information can be associated with location information of the key information in the data package, thereby realizing a strong binding between key data and the location information, and realizing atomized fine-grained location detection of key information.

7. Construct Data Display and Problem Early Warning Services.

For example, the detected key information is displayed in detail, including a protocol to which the key information belongs, a data packet to which the key information belongs, location information of the key information in the data packet, a content of the key information, a type of the key information, and the like.

For example, one or more key information detection results can be formed into a detailed detection report, for example, a web page and a portable document format (PDF).

For example, in the case that the key information is detected, an early warning such as an email or a short message can be triggered.

The methods provided by the present disclosure are described above, and the following are descriptions of apparatuses provided by the present disclosure.

Figure 2:
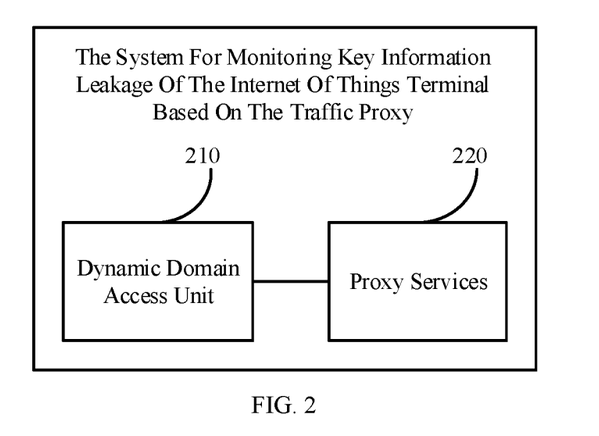
FIG. 2 is a schematic structural diagram illustrating a system for monitoring key information leakage of an Internet of Things terminal based on a traffic proxy according to an exemplary embodiment of the present disclosure.

Referring to FIG. 2, FIG. 2 is a schematic structural diagram illustrating a system for monitoring key information leakage of an Internet of Things terminal based on a traffic proxy according to an exemplary embodiment of the present disclosure. As shown in FIG. 2, the system for monitoring key information leakage of the Internet of Things terminal based on the traffic proxy can include: a dynamic domain access unit 210 and one or more proxy services 220.

The dynamic domain access unit 210 is configured to receive a proxy request sent by an Internet of Things (IoT) terminal, wherein the proxy request includes protocol-related information of the IoT terminal, and the protocol-related information includes part or all of device model information, service type information and data packet information.

The dynamic domain access unit 210 is further configured to determine a target protocol corresponding to the IoT terminal according to the protocol-related information of the IoT terminal.

The dynamic domain access unit 210 is further configured to allocate a target proxy service to the IoT terminal according to the target protocol and an usage state and an online state of one or more proxy services in a full traffic proxy pool, wherein the full traffic proxy pool includes a plurality of proxy services corresponding to different protocols, and the target proxy service is a proxy service corresponding to the target protocol and having a usage state of being idle and an online state of being online in the plurality of proxy services.

In response to the proxy service 220 serving as the target proxy service, the dynamic domain access unit 210 is further configured to perform key information monitoring on traffic of the IoT terminal through the target proxy service.

In some embodiments, the full traffic proxy pool includes one or more proxy services corresponding to a single protocol, and one or more proxy services corresponding to a plurality of protocols;
in response to the target protocol including a plurality of different protocols, the target proxy service is a proxy service corresponding to the plurality of different protocols and having a usage state of being idle and an online state of being online.

In some embodiments, the proxy request further includes device identification information,
the dynamic domain access unit 210 is further configured to generate a uniqueness verification identifier according to the device identification information of the IoT terminal and identification information of the target proxy service, so that the proxy service 220 performs service-bound uniqueness verification according to the device identification information of the IoT terminal, the identification information of the target proxy service and the uniqueness verification identifier in response to serving as the target proxy service and receiving the traffic sent by the IoT terminal, and performs key information monitoring on the traffic in response to a successful verification.

In some embodiments, performing, by the dynamic domain access unit 210, key information monitoring on the traffic of the IoT terminal through the target proxy service includes: segmenting a data packet of the IoT terminal according to a protocol template of the target protocol through the target proxy service to obtain segmented data, wherein the protocol template includes part or all of protocol data packet size information, protocol data structure information, protocol data field information, protocol data field feature set information and protocol data interaction mode information; and performing key information monitoring according to the segmented data of the IoT terminal through the target proxy service.

In some embodiments, segmenting the data packet of the IoT terminal through the target proxy service includes:
segmenting the data packet of the IoT terminal according to atomic granularity through the target proxy service to obtain atomic granularity data corresponding to the data packet, wherein the atomic granularity data is in a form of location-content, and the atomic granularity data is the smallest unit of the data packet.

In some embodiments, before performing, by the dynamic domain access unit 210, key information monitoring on the traffic of the IoT terminal through the target proxy service, filtering invalid traffic in the traffic of the IoT terminal according to one or more invalid traffic features in an invalid traffic feature library through the target proxy service.

In some embodiments, performing, by the dynamic domain access unit 210, key information monitoring on the traffic of the IoT terminal through the target proxy service includes: performing key information detection on the traffic of the IoT terminal using a preset key information detection method through the target proxy service,
wherein the preset key information detection method includes at least two of following detection methods:
a key information detection method based on a feature set, a key information detection method based on a pattern set and a key information detection method based on a machine learning model set.

In some embodiments, after performing, by the dynamic domain access unit, key information monitoring on the traffic of the IoT terminal through the target proxy service, in response to key information being detected, displaying one or more key information detection results through the target proxy service, and/or giving an early warning of the key information detection results,
wherein the key information detection results include one or more of the following:
a protocol to which the key information belongs, a data packet to which the key information belongs, location information of the key information in the data packet, a content of the key information and a type of the key information.

The embodiments of the present disclosure provide an electronic device including a processor and a memory, wherein the memory stores machine-executable instructions that can be executed by the processor, and the processor is configured to execute the machine-executable instructions to implement the method for monitoring key information leakage of the Internet of Things terminal based on the traffic proxy described above.

Figure 3:
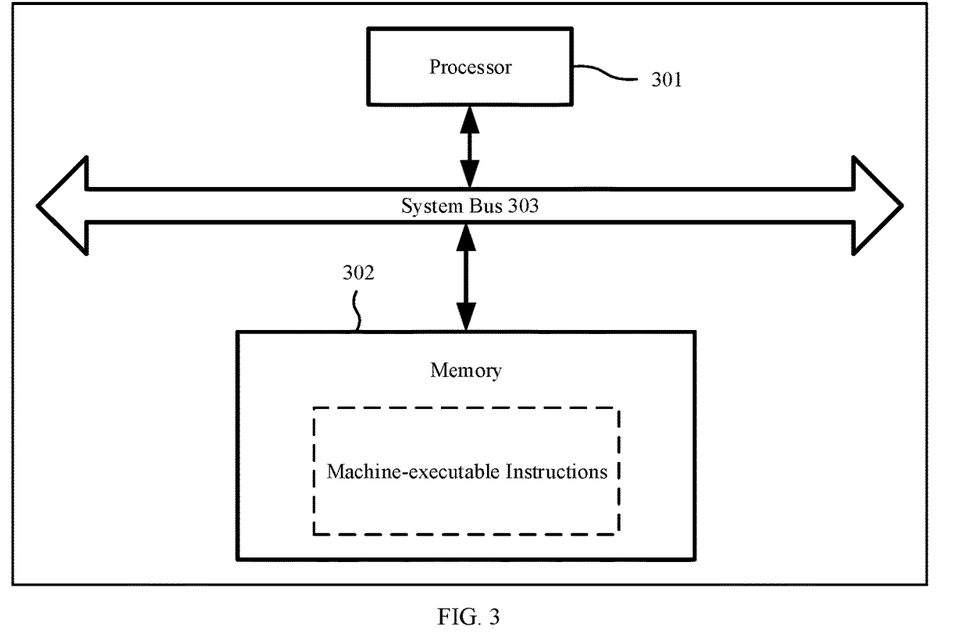
FIG. 3 is a schematic diagram illustrating a hardware structure of an electronic device according to an exemplary embodiment of the present disclosure.

Referring to FIG. 3, FIG. 3 is a schematic diagram illustrating a hardware structure of an electronic device according to an exemplary embodiment of the present disclosure. The electronic device may include a processor 301 and a memory 302 storing machine-executable instructions. The processor 301 and the memory 302 may communicate via a system bus 303. Furthermore, by reading and executing machine-executable instructions corresponding to key information leakage monitoring logics of the Internet of Things terminal based on the traffic proxy in the memory 302, the processor 301 may perform the method for monitoring key information leakage of the Internet of Things terminal based on the traffic proxy described above.

The memory 302 mentioned herein may be any electronic, magnetic, optical or other physical storage device, and may contain or store information, such as executable instructions, data, and the like. For example, the machine-readable storage medium can be a random access memory (RAM), a volatile memory, a non-volatile memory, a flash memory, a storage drive (for example, a hard disk drive), a solid state disk, any type of storage disk (for example, an optical disk, a dvd, and the like), or a similar storage media, or a combination thereof.

In some embodiments, there is also provided a machine-readable storage medium, for example, the memory 302 in FIG. 3. The machine-readable storage medium stores machine-executable instructions. When the machine-executable instructions are executed by a processor, the method for monitoring key information leakage of the Internet of Things terminal based on the traffic proxy described above is implemented. For example, the machine-readable storage medium can be a ROM, a RAM, a CD-ROM, a magnetic tape, a floppy disk, an optical data storage device, and the like.

The embodiments of the present disclosure further provide a computer program stored on a machine-readable storage medium, for example, the memory 302 in FIG. 3. The computer program, when executed by a processor, causes the processor 301 to perform the method for monitoring key information leakage of the Internet of Things terminal based on the traffic proxy described above.

It should be noted that, in this context, relational terms such as "first" and "second" are used merely to distinguish one entity or operation from the other entity or operation, and do not necessarily require or imply the existence of any such actual relationship or order between these entities or operations. The terms "including", "including" or any other variants thereof are intended to cover non-exclusive inclusion, such that a process, method, article, or device including a series of elements includes not only those elements but also other elements not specifically listed, or further includes elements inherent to such process, method, article, or device. Under the circumstance of no more limitation, an element limited by the phrase "including a . . . " does not exclude the presence of additional equivalent elements in the process, method, article, or device that includes the element.

The above descriptions are preferred embodiments provided by the present disclosure, which are not intended to limit the present disclosure. Any modification, equivalent replacement, improvement, etc. made within the spirit and principle of the present disclosure shall be included within the scope of the claims of the present disclosure.

The invention claimed is:

1. A method for monitoring key information leakage of an Internet of Things (IoT) terminal based on a traffic proxy, comprising:
receiving a proxy request sent by the IoT terminal, wherein the proxy request comprises protocol-related information of the IoT terminal, and the protocol-related information comprises part or all of device model information, service type information and data packet information;
determining a target protocol corresponding to the IoT terminal according to the protocol-related information of the IoT terminal;
allocating a target proxy service to the IoT terminal according to the target protocol and a usage state and an online state of one or more proxy services in a full traffic proxy pool, sending relevant information of the target proxy service to the IoT terminal, so that the IoT terminal accesses the target proxy service; and
forwarding traffic of the IoT terminal and performing key information monitoring on the traffic of the IoT terminal through the target proxy service;
wherein the full traffic proxy pool comprises a plurality of proxy services corresponding to different protocols, and the target proxy service is a proxy service corresponding to the target protocol and having a usage state of being idle and an online state of being online in the plurality of proxy services;
wherein the proxy request further comprises device identification information of the IoT terminal,
after allocating the target proxy service to the IoT terminal, the method further comprises:
generating a uniqueness verification identifier according to the device identification information of the IoT terminal and identification information of the target proxy service, so that the target proxy service performs service-bound uniqueness verification according to the device identification information of the IoT terminal, the identification information of the target proxy service and the uniqueness verification identifier in response to receiving the traffic sent by the IoT terminal, and performs key information monitoring on the traffic in response to a successful verification.

2. The method according to claim 1, wherein the full traffic proxy pool comprises one or more proxy services corresponding to a single protocol, and one or more proxy services corresponding to a plurality of protocols,
in response to the target protocol comprising a plurality of different protocols, the target proxy service is a proxy service corresponding to the plurality of different protocols and having a usage state of being idle and an online state of being online.

3. The method according to claim 1, wherein performing key information monitoring on the traffic of the IoT terminal through the target proxy service comprises:
segmenting a data packet of the IoT terminal according to a protocol template of the target protocol, wherein the protocol template comprises part or all of protocol data packet size information, protocol data structure information, protocol data field information, protocol data field feature set information and protocol data interaction mode information; and
performing key information monitoring according to segmented data of the IoT terminal.

4. The method according to claim 3, wherein segmenting the data packet of the IoT terminal comprises:
segmenting the data packet of the IoT terminal into atomic granularity to obtain atomic granularity data corresponding to the data packet, wherein the atomic granularity data is in a form of location-content, and the atomic granularity data is the smallest unit of the data packet.

5. The method according to claim 1, wherein before performing key information monitoring on the traffic of the IoT terminal through the target proxy service, the method further comprises:
filtering invalid traffic in the traffic of the IoT terminal according to one or more invalid traffic features in an invalid traffic feature library.

6. The method according to claim 1, wherein performing key information monitoring on the traffic of the IoT terminal through the target proxy service comprises:
performing key information detection on the traffic of the IoT terminal using a preset key information detection method,
wherein the preset key information detection method comprises at least two of:
a key information detection method based on a feature set, a key information detection method based on a pattern set, and a key information detection method based on a machine learning model set.

7. The method according to claim 1, wherein after performing key information monitoring on the traffic of the IoT terminal through the target proxy service, the method further comprises:
in response to key information being detected, displaying one or more key information detection results, and/or giving an early warning of the key information detection results,
wherein the key information detection results comprise one or more of:
a protocol to which the key information belongs, a data packet to which the key information belongs, location information of the key information in the data packet, a content of the key information, and a type of the key information.

8. A system for monitoring key information leakage of an Internet of Things (IoT) terminal based on a traffic proxy, comprising: a dynamic domain access unit and one or more proxy services, wherein
the dynamic domain access unit is configured to receive a proxy request sent by the IoT terminal, wherein the proxy request comprises protocol-related information of the IoT terminal, and the protocol-related information comprises part or all of device model information, service type information and data packet information;
the dynamic domain access unit is further configured to determine a target protocol corresponding to the IoT terminal according to the protocol-related information of the IoT terminal; and
the dynamic domain access unit is further configured to allocate a target proxy service to the IoT terminal according to the target protocol and a usage state and an online state of one or more proxy services in a full traffic proxy pool, send relevant information of the target proxy service to the IoT terminal, so that the IoT terminal accesses the target proxy service; wherein the full traffic proxy pool comprises a plurality of proxy services corresponding to different protocols, and the target proxy service is a proxy service corresponding to the target protocol and having a usage state of being idle and an online state of being online in the plurality of proxy services,
wherein the proxy service is further configured to, in response to the proxy service serving as the target proxy service, forward traffic of the IoT terminal and perform key information monitoring on the traffic of the IoT terminal;
wherein the proxy request further comprises device identification information of the IoT terminal,
the dynamic domain access unit is further configured to generate a uniqueness verification identifier according to the device identification information of the IoT terminal and identification information of the target proxy service;
the proxy service is further configured to, in response to the proxy service serving as the target proxy service and receiving the traffic sent by the IoT terminal, perform service-bound uniqueness verification according to the device identification information of the IoT terminal the identification information of the target proxy service and the uniqueness verification identifier, and perform key information monitoring on the traffic in response to a successful verification.

9. The system according to claim 8, wherein the full traffic proxy pool comprises one or more proxy services corresponding to a single protocol, and one or more proxy services corresponding to a plurality of protocols;
in response to the target protocol comprising a plurality of different protocols, the target proxy service is a proxy service corresponding to the plurality of different protocols and having a usage state of being idle and an online state of being online;
and/or,
wherein the proxy service is configured to, in response to the proxy service serving as the target proxy service, segment a data packet of the IoT terminal according to a protocol template of the target protocol, wherein the protocol template comprises part or all of protocol data packet size information, protocol data structure information, protocol data field information, protocol data field feature set information and protocol data interaction mode information; and performing key information monitoring according to segmented data of the IoT terminal,
wherein segmenting the data packet of the IoT terminal by the proxy service comprises:
segmenting the data packet of the IoT terminal into atomic granularity to obtain atomic granularity data corresponding to the data packet, wherein the atomic granularity data is in a form of location-content, and the atomic granularity data is the smallest unit of the data packet;
and/or,
wherein the proxy service is further configured to, in response to the proxy service serving as the target proxy service, filter invalid traffic in the traffic of the IoT terminal according to one or more invalid traffic features in an invalid traffic feature library;
and/or,
wherein the proxy service is configured to, in response to the proxy service serving as the target proxy service, perform key information detection on the traffic of the IoT terminal using a preset key information detection method,
wherein the preset key information detection method comprises at least two of:
a key information detection method based on a feature set, a key information detection method based on a pattern set and a key information detection method based on a machine learning model set;
and/or,
wherein the proxy service is further configured to, in response to the proxy service serving as the target proxy service, in a case of key information being detected, display one or more key information detection results, and/or give an early warning of the key information detection results,
wherein the key information detection results comprise one or more of:
a protocol to which the key information belongs, a data packet to which the key information belongs, location information of the key information in the data packet, a content of the key information and a type of the key information.

* * * * *